(12) United States Patent
Chard et al.

(10) Patent No.: US 7,518,740 B2
(45) Date of Patent: Apr. 14, 2009

(54) EVALUATING A PROFILE MODEL TO CHARACTERIZE A STRUCTURE TO BE EXAMINED USING OPTICAL METROLOGY

(75) Inventors: Jeffrey A. Chard, Sunnyvale, CA (US); Junwei Bao, Palo Alto, CA (US); Youxian Wen, Fremont, CA (US); Sanjay Yedur, Fremont, CA (US)

(73) Assignee: Tokyo Electron Limited, Tokyo (JP)

( * ) Notice: Subject to any disclaimer, the term of this patent is extended or adjusted under 35 U.S.C. 154(b) by 274 days.

(21) Appl. No.: 11/484,459

(22) Filed: Jul. 10, 2006

(65) Prior Publication Data

US 2008/0007738 A1    Jan. 10, 2008

(51) Int. Cl.
*G01B 11/14* (2006.01)
*G01B 11/24* (2006.01)
*G06F 19/00* (2006.01)

(52) U.S. Cl. .................. 356/625; 356/601; 356/636; 702/189; 700/121

(58) Field of Classification Search .............. 356/601, 356/614, 625–636, 237.5–237.6; 700/121, 700/95–96, 108; 438/14–16; 702/189
See application file for complete search history.

(56) References Cited

U.S. PATENT DOCUMENTS

| | | | |
|---|---|---|---|
| 6,636,843 B2 * | 10/2003 | Doddi et al. ............ | 706/46 |
| 6,721,691 B2 * | 4/2004 | Bao et al. ............ | 702/189 |
| 6,750,961 B2 * | 6/2004 | Niu et al. ............ | 356/237.5 |
| 6,760,117 B2 | 7/2004 | Slatter et al. | |
| 6,775,015 B2 * | 8/2004 | Bischoff et al. ........ | 356/636 |
| 6,792,328 B2 * | 9/2004 | Laughery et al. ....... | 700/121 |
| 6,842,261 B2 * | 1/2005 | Bao et al. ............ | 356/636 |
| 6,943,900 B2 * | 9/2005 | Niu et al. ............ | 356/625 |
| 7,065,423 B2 * | 6/2006 | Prager et al. .......... | 700/108 |
| 7,072,049 B2 * | 7/2006 | Niu et al. ............ | 356/601 |
| 7,092,110 B2 * | 8/2006 | Balasubramanian et al. | 356/625 |
| 7,145,664 B2 | 12/2006 | Opsal et al. | |
| 7,221,989 B2 * | 5/2007 | Prager et al. .......... | 700/108 |
| 2002/0033954 A1 | 3/2002 | Niu et al. | |
| 2002/0035455 A1 | 3/2002 | Niu et al. | |
| 2003/0028358 A1 | 2/2003 | Niu et al. | |

(Continued)

OTHER PUBLICATIONS

Li, L. (1996). "Formulation and comparison of two recursive matrix algorithms for modeling layered diffraction gratings," *Journal of the Optical Society of America A* 13:1024-1035.

(Continued)

*Primary Examiner*—Sang Nguyen
(74) *Attorney, Agent, or Firm*—Morrison & Foerster LLP (57) ABSTRACT

A profile model to characterize a structure to be examined using optical metrology is evaluated by displaying a set of profile parameters that characterizes the profile model. Each profile parameter has a range of values for the profile parameter. For each profile parameter having a range of values, an adjustment tool is displayed for selecting a value for the profile parameter within the range of values. A measured diffraction signal, which was measured using an optical metrology tool, is displayed. A simulated diffraction signal, which was generated based on the values of the profile parameters selected using the adjustment tools for the profile parameters, is displayed. The simulated diffraction signal is overlaid with the measured diffraction signal.

20 Claims, 6 Drawing Sheets

U.S. PATENT DOCUMENTS

2004/0267397 A1    12/2004    Doddi et al.
2005/0209816 A1    9/2005     Vuong et al.

OTHER PUBLICATIONS

Haykin, S. (1999). *Neural Networks*. 2nd edition, M. Horton ed., Prentice Hall: Upper Saddle River, New Jersey, 9 pages (Table of Contents).

Ausschnitt, C. P. (Feb. 23, 2004). "A New Approach to Pattern Metrology," *Proceedings of SPIE* 5375:51-65.

U.S. Appl. No. 11/484,974, filed Jul. 11, 2006 for Chard et al.

* cited by examiner

EVALUATING A PROFILE MODEL TO CHARACTERIZE A STRUCTURE TO BE EXAMINED USING OPTICAL METROLOGY

BACKGROUND

1. Field

The present application generally relates to optical metrology of a structure formed on a semiconductor wafer, and, more particularly, to evaluating a profile model to characterize the structure to be examined using optical metrology.

2. Description of the Related Art

Optical metrology involves directing an incident beam at a structure, measuring the resulting diffracted beam, and analyzing the diffracted beam to determine a feature of the structure. In semiconductor manufacturing, optical metrology is typically used for quality assurance. For example, after fabricating a structure on a semiconductor wafer, an optical metrology tool is used to determine the profile of the structure. By determining the profile of the structure, the quality of the fabrication process utilized to form the structure can be evaluated.

In one conventional optical metrology system, a diffraction signal collected from illuminating a structure (a measured diffraction signal) is compared to simulated diffraction signals, which are associated with hypothetical profiles of the structure. When a match is found between the measured diffraction signal and one of the simulated diffraction signals, the hypothetical profile associated with the matching simulated diffraction signal is presumed to represent the actual profile of the structure.

The hypothetical profiles, which are used to generate the simulated diffraction signals, are generated based on a profile model that characterizes the structure to be examined. Thus, in order to accurately determine the profile of the structure using optical metrology, a profile model that accurately characterizes the structure should be used.

SUMMARY

In one exemplary embodiment, a profile model to characterize a structure to be examined using optical metrology is evaluated by displaying a set of profile parameters that characterizes the profile model. Each profile parameter has a range of values for the profile parameter. For each profile parameter having a range of values, an adjustment tool is displayed for selecting a value for the profile parameter within the range of values. A measured diffraction signal, which was measured using an optical metrology tool, is displayed. A simulated diffraction signal, which was generated based on the values of the profile parameters selected using the adjustment tools for the profile parameters, is displayed. The simulated diffraction signal is overlaid with the measured diffraction signal.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

1. Optical Metrology Tools

Figure 1:
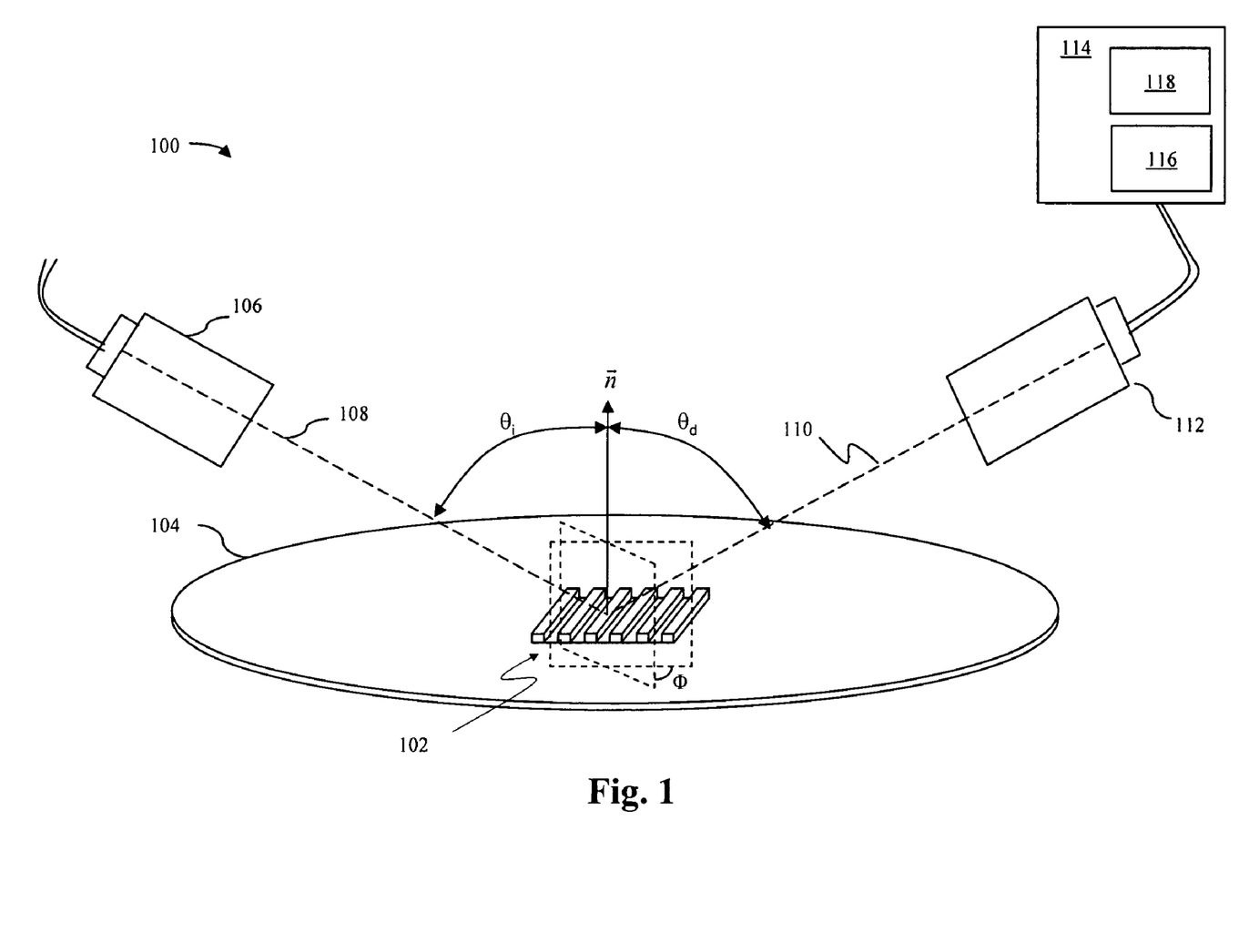
FIG. 1 depicts an exemplary optical metrology system.

With reference to FIG. 1, an optical metrology system 100 can be used to examine and analyze a structure formed on a semiconductor wafer 104. For example, optical metrology system 100 can be used to determine one or more features of a periodic grating 102 formed on wafer 104. As described earlier, periodic grating 102 can be formed in a test pad on wafer 104, such as adjacent to a die formed on wafer 104. Periodic grating 102 can be formed in a scribe line and/or an area of the die that does not interfere with the operation of the die.

As depicted in FIG. 1, optical metrology system 100 can include a photometric device with a source 106 and a detector 112. Periodic grating 102 is illuminated by an incident beam 108 from source 106. The incident beam 108 is directed onto periodic grating 102 at an angle of incidence $\theta_i$ with respect to normal $\vec{n}$ of periodic grating 102 and an azimuth angle $\Phi$ (i.e., the angle between the plane of incidence beam 108 and the direction of the periodicity of periodic grating 102). Diffracted beam 110 leaves at an angle of $\theta_d$ with respect to normal and is received by detector 112. Detector 112 converts the diffracted beam 110 into a measured diffraction signal, which can include reflectance, $\tan(\Psi)$, $\cos(\Delta)$, Fourier coefficients, and the like. Although a zero-order diffraction signal is depicted in FIG. 1, it should be recognized that non-zero orders can also be used. For example, see Ausschnitt, Christopher P., "A New Approach to Pattern Metrology," Proc. SPIE 5375-7, Feb. 23, 2004, pp 1-15, which is incorporated herein by reference in its entirety.

Optical metrology system 100 also includes a processing module 114 configured to receive the measured diffraction signal and analyze the measured diffraction signal. The processing module is configured to determine one or more features of the periodic grating using any number of methods which provide a best matching diffraction signal to the measured diffraction signal. These methods have been described elsewhere and include a library-based process, or a regression based process using simulated diffraction signals obtained by rigorous coupled wave analysis and machine learning systems.

2. Library-Based Process of Determining Feature of Structure

In a library-based process of determining one or more features of a structure, the measured diffraction signal is compared to a library of simulated diffraction signals. More specifically, each simulated diffraction signal in the library is associated with a hypothetical profile of the structure. When a match is made between the measured diffraction signal and one of the simulated diffraction signals in the library or when the difference of the measured diffraction signal and one of the simulated diffraction signals is within a preset or matching criterion, the hypothetical profile associated with the matching simulated diffraction signal is presumed to represent the actual profile of the structure. The matching simulated diffraction signal and/or hypothetical profile can then be utilized to determine whether the structure has been fabricated according to specifications.

Thus, with reference again to FIG. 1, in one exemplary embodiment, after obtaining a measured diffraction signal, processing module 114 then compares the measured diffraction signal to simulated diffraction signals stored in a library 116. Each simulated diffraction signal in library 116 can be associated with a hypothetical profile. Thus, when a match is made between the measured diffraction signal and one of the simulated diffraction signals in library 116, the hypothetical profile associated with the matching simulated diffraction signal can be presumed to represent the actual profile of periodic grating 102.

The set of hypothetical profiles stored in library 116 can be generated by characterizing the profile of periodic grating 102 using a profile model. The profile model is characterized using a set of profile parameters. The profile parameters of the profile model are varied to generate hypothetical profiles of varying shapes and dimensions. The process of characterizing the actual profile of periodic grating 102 using profile model and a set of profile parameters can be referred to as parameterizing.

Figure 2A:
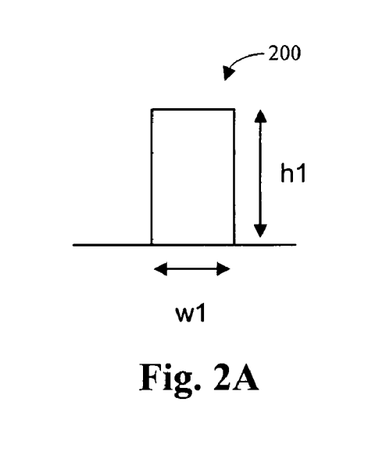
FIGS. 2A-2E depict exemplary profile models.
Figure 2B:
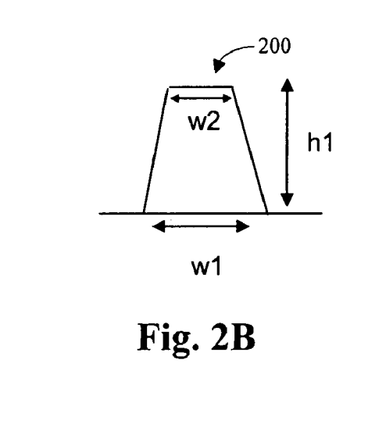
Figure 2C:
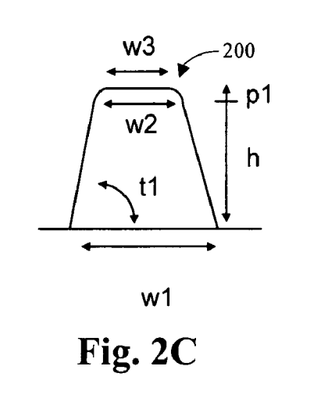
Figure 2D:
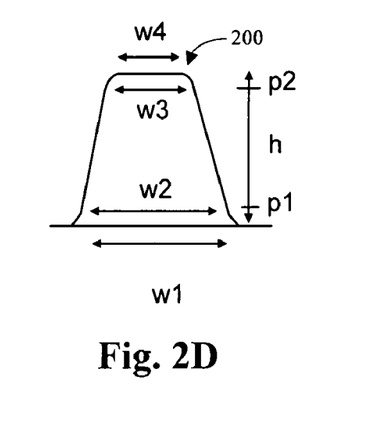
Figure 2E:
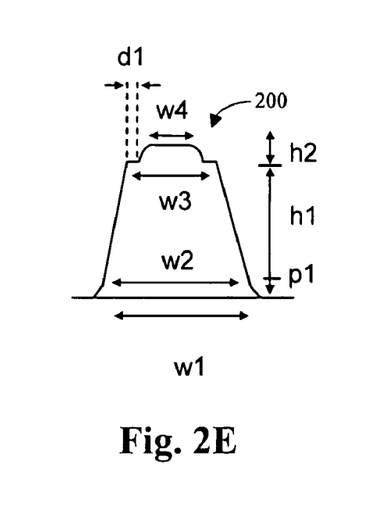

For example, as depicted in FIG. 2A, assume that profile model 200 can be characterized by profile parameters h1 and w1 that define its height and width, respectively. As depicted in FIGS. 2B to 2E, additional shapes and features of profile model 200 can be characterized by increasing the number of profile parameters. For example, as depicted in FIG. 2B, profile model 200 can be characterized by profile parameters h1, w1, and w2 that define its height, bottom width, and top width, respectively. Note that the width of profile model 200 can be referred to as the critical dimension (CD). For example, in FIG. 2B, profile parameter w1 and w2 can be described as defining the bottom CD (BCD) and top CD (TCD), respectively, of profile model 200.

As described above, the set of hypothetical profiles stored in library 116 (FIG. 1) can be generated by varying the profile parameters that characterize the profile model. For example, with reference to FIG. 2B, by varying profile parameters h1, w1, and w2, hypothetical profiles of varying shapes and dimensions can be generated. Note that one, two, or all three profile parameters can be varied relative to one another.

With reference again to FIG. 1, the number of hypothetical profiles and corresponding simulated diffraction signals in the set of hypothetical profiles and simulated diffraction signals stored in library 116 (i.e., the resolution and/or range of library 116) depends, in part, on the range over which the set of profile parameters and the increment at which the set of profile parameters are varied. The hypothetical profiles and the simulated diffraction signals stored in library 116 are generated prior to obtaining a measured diffraction signal from an actual structure. Thus, the range and increment (i.e., the range and resolution) used in generating library 116 can be selected based on familiarity with the fabrication process for a structure and what the range of variance is likely to be. The range and/or resolution of library 116 can also be selected based on empirical measures, such as measurements using AFM, X-SEM, and the like.

For a more detailed description of a library-based process, see U.S. patent application Ser. No. 09/907,488, titled GENERATION OF A LIBRARY OF PERIODIC GRATING DIFFRACTION SIGNALS, filed on Jul. 16, 2001, which is incorporated herein by reference in its entirety.

3. Regression-Based Process of Determining Feature of Structure

In a regression-based process of determining one or more features of a structure, the measured diffraction signal is compared to a simulated diffraction signal (i.e., a trial diffraction signal). The simulated diffraction signal is generated prior to the comparison using a set of profile parameters (i.e., trial profile parameters) for a hypothetical profile. If the measured diffraction signal and the simulated diffraction signal do not match or when the difference of the measured diffraction signal and one of the simulated diffraction signals is not within a preset or matching criterion, another simulated diffraction signal is generated using another set of profile parameters for another hypothetical profile, then the measured diffraction signal and the newly generated simulated diffraction signal are compared. When the measured diffraction signal and the simulated diffraction signal match or when the difference of the measured diffraction signal and one of the simulated diffraction signals is within a preset or matching criterion, the hypothetical profile associated with the matching simulated diffraction signal is presumed to represent the actual profile of the structure. The matching simulated diffraction signal and/or hypothetical profile can then be utilized to determine whether the structure has been fabricated according to specifications.

Thus, with reference again to FIG. 1, the processing module 114 can generate a simulated diffraction signal for a hypothetical profile, and then compare the measured diffraction signal to the simulated diffraction signal. As described above, if the measured diffraction signal and the simulated diffraction signal do not match or when the difference of the measured diffraction signal and one of the simulated diffraction signals is not within a preset or matching criterion, then processing module 114 can iteratively generate another simulated diffraction signal for another hypothetical profile. The subsequently generated simulated diffraction signal can be generated using an optimization algorithm, such as global optimization techniques, which includes simulated annealing, and local optimization techniques, which includes steepest descent algorithm.

The simulated diffraction signals and hypothetical profiles can be stored in a library 116 (i.e., a dynamic library). The simulated diffraction signals and hypothetical profiles stored in library 116 can then be subsequently used in matching the measured diffraction signal.

For a more detailed description of a regression-based process, see U.S. patent application Ser. No. 09/923,578, titled METHOD AND SYSTEM OF DYNAMIC LEARNING THROUGH A REGRESSION-BASED LIBRARY GENERATION PROCESS, filed on Aug. 6, 2001, which is incorporated herein by reference in its entirety.

4. Rigorous Coupled Wave Analysis

As described above, simulated diffraction signals are generated to be compared to measured diffraction signals. As will be described below, the simulated diffraction signals can be generated by applying Maxwell's equations and using a numerical analysis technique to solve Maxwell's equations. It should be noted, however, that various numerical analysis techniques, including variations of RCWA, can be used.

In general, RCWA involves dividing a hypothetical profile into a number of sections, slices, or slabs (hereafter simply referred to as sections). For each section of the hypothetical profile, a system of coupled differential equations is generated using a Fourier expansion of Maxwell's equations (i.e., the components of the electromagnetic field and permittivity ($\epsilon$)). The system of differential equations is then solved using a diagonalization procedure that involves eigenvalue and eigenvector decomposition (i.e., Eigen-decomposition) of the characteristic matrix of the related differential equation system. Finally, the solutions for each section of the hypothetical profile are coupled using a recursive-coupling schema, such as a scattering matrix approach. For a description of a scattering matrix approach, see Lifeng Li, "Formulation and comparison of two recursive matrix algorithms for modeling layered diffraction gratings," J. Opt. Soc. Am. A13, pp 1024-1035 (1996), which is incorporated herein by reference in its entirety. For a more detail description of RCWA, see U.S. patent application Ser. No. 09/770,997, titled CACHING OF INTRA-LAYER CALCULATIONS FOR RAPID RIGOROUS COUPLED-WAVE ANALYSES, filed on Jan. 25, 2001, which is incorporated herein by reference in its entirety.

5. Machine Learning Systems

The simulated diffraction signals can be generated using a machine learning system (MLS) employing a machine learning algorithm, such as back-propagation, radial basis function, support vector, kernel regression, and the like. For a more detailed description of machine learning systems and algorithms, see "Neural Networks" by Simon Haykin, Prentice Hall, 1999, which is incorporated herein by reference in its entirety. See also U.S. patent application Ser. No. 10/608,300, titled OPTICAL METROLOGY OF STRUCTURES FORMED ON SEMICONDUCTOR WAFERS USING MACHINE LEARNING SYSTEMS, filed on Jun. 27, 2003, which is incorporated herein by reference in its entirety.

In one exemplary embodiment, the simulated diffraction signals in a library of diffraction signals, such as library 116 (FIG. 1), used in a library-based process are generated using a MLS. For example, a set of hypothetical profiles can be provided as inputs to the MLS to produce a set of simulated diffraction signals as outputs from the MLS. The set of hypothetical profiles and set of simulated diffraction signals are stored in the library.

In another exemplary embodiment, the simulated diffractions used in regression-based process are generated using a MLS, such as MLS 118 (FIG. 1). For example, an initial hypothetical profile can be provided as an input to the MLS to produce an initial simulated diffraction signal as an output from the MLS. If the initial simulated diffraction signal does not match the measured diffraction signal, another hypothetical profile can be provided as an additional input to the MLS to produce another simulated diffraction signal.

FIG. 1 depicts processing module 114 having both a library 116 and MLS 118. It should be recognized, however, that processing module 114 can have either library 116 or MLS 118 rather than both. For example, if processing module 114 only uses a library-based process, MLS 118 can be omitted. Alternatively, if processing module 114 only uses a regression-based process, library 116 can be omitted. Note, however, a regression-based process can include storing hypothetical profiles and simulated diffraction signals generated during the regression process in a library, such as library 116.

6. Evaluating a Profile Model

As described above, in both a library-based process and a regression-based process, a simulated diffraction signal is generated based on a hypothetical profile of the structure to be examined. As also described above, the hypothetical profile is generated based on a profile model that characterizes the structure to be examined. The profile model is characterized using a set of profile parameters, which are varied to generate hypothetical profiles of varying shapes and sizes.

Figure 3:
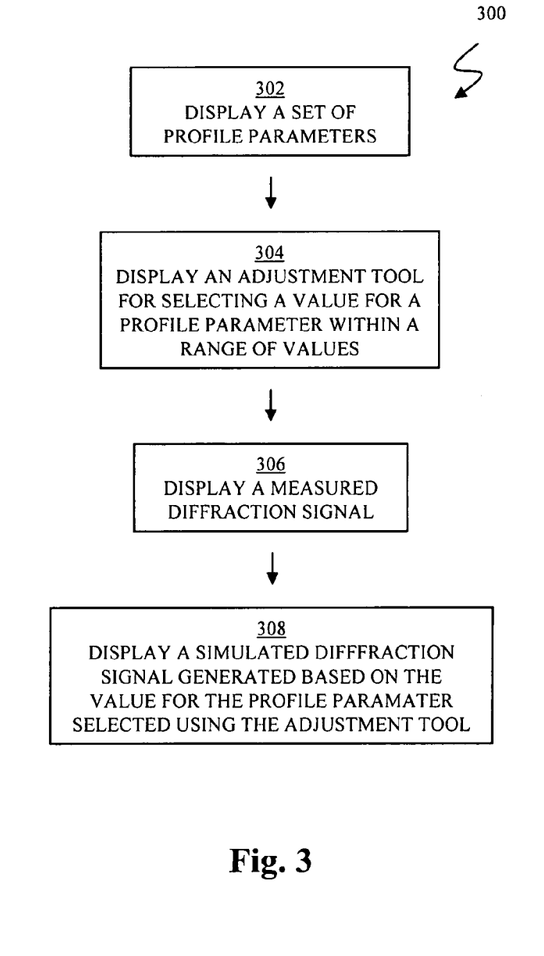
FIG. 3 depicts an exemplary process of evaluating a profile model.

With reference to FIG. 3, an exemplary process 300 is depicted of evaluating a profile model before using the profile model to generate hypothetical profiles in a library-based process or a regression-based process of determining features of a structure. It should be recognized, however, that exemplary process 300 can be used to evaluate a profile model at various times and for various reasons.

Figure 4A:
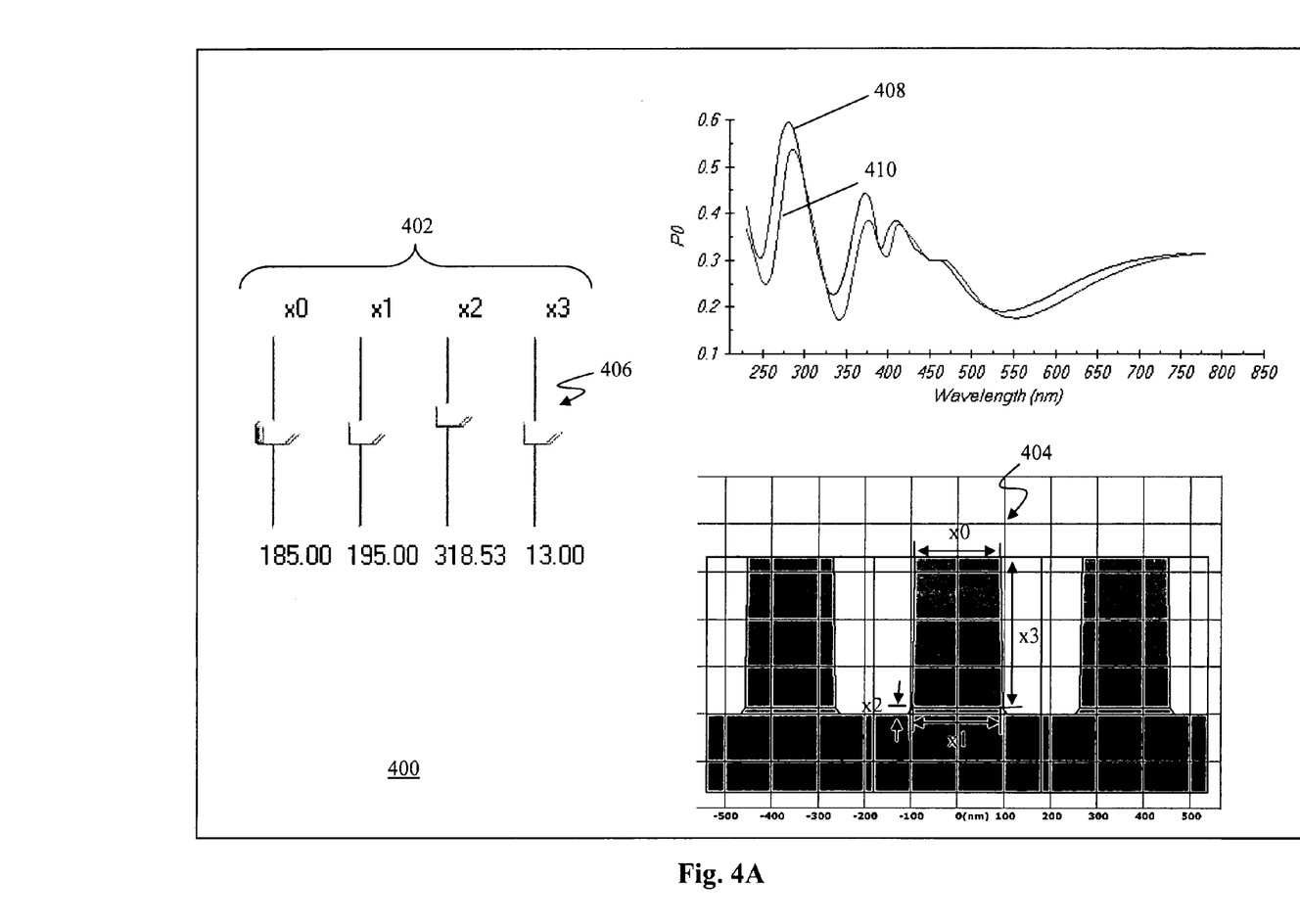
FIGS. 4A and 4B depict a display displaying a profile model, profile parameters of the profile model, a measured diffraction signal, and a simulated diffraction signal.

In step 302, a set of profile parameters that characterize the profile model is displayed. FIG. 4A depicts a display 400 with a set of profile parameters 402 displayed. As depicted in FIG. 4A, display 400 can also include profile model 404, which can be displayed along with set of profile parameters 402 that characterizes profile model 404. It should be recognized, however, that set of profile parameters 402 can be displayed without profile model 404.

As depicted in FIG. 4A, for the sake of example, set of profile parameters 402 includes profile parameters x0, x1, x2, and x3. As also depicted in FIG. 4A, in the present example, profile parameter x0 characterizes the top width or critical dimension of profile model 404. Profile parameter x1 characterizes the bottom width or critical dimension of profile model 404. Profile parameter x2 characterizes the footing height of profile model 404. Profile parameter x3 characterizes the height from the top of the footing to the top of profile model 404. It should be recognized, however, that set of profile parameters 402 can characterize various aspects and/or features of profile model 404, such as refractive index (n) of the material, the absorption index (k) of the material, the optical metrology tool used, the angle of incidence of the metrology beam, and the like. For example, a profile parameter can characterize a separation distance between dual pitch profiles, which have one pitch between one set of lines and another pitch between another set of lines. The set of profile parameters can also characterize a profile that varies in two or more dimensions. For a more detail description of modeling two-dimension repeating structures, refer to U.S. patent application Ser. No. 11/061,303, titled OPTICAL METROLOGY OPTIMIZATION FOR REPETITIVE STRUCURES, filed on Apr. 27, 2004, which is incorporated herein by reference in its entirety.

In the present example, the profile parameters in set of profile parameters 402 have ranges of values. In particular, profile parameters x0, x1, x2, and x3 have ranges of values associated with ranges of values for the top width, bottom width, footing height, and height from the top of the footing to the top of profile model 404, respectively. It should be recognized, however, that profile model 404 can be characterized with one or more profile parameters that are fixed. For example, the profile parameters characterizing the angle of incidence of the metrology beam can be fixed, such as at zero degrees. In the present example, the profile parameters having ranges of values are displayed, while the profile parameters that are fixed are not displayed. It should be recognized, however, that profile parameters that are fixed can be displayed with the profile parameters having ranges of values.

With reference again to FIG. 3, in step 304, for a profile parameter having a range of values, an adjustment tool for selecting a value for the profile parameter within the range is displayed. With reference to FIG. 4A, in the present example, the adjustment tool is depicted as being a track bar 406. In particular, FIG. 4A depicts four track bars 406 for profile parameters x0, x1, x2, and x3. Thus, a user can select values for profile parameters x0, x1, x2, and x3 within ranges of values for profile parameters x0, x1, x2, and x3 using track bars 406. As depicted in FIG. 4A, in the present example, the selected values can be displayed. For example, the selected values for parameters x0, x1, x2, and x3 displayed in display 400 are 185, 195, 318.53, and 13 nanometers, respectively.

It should be recognized, however, that various types of adjustment tools can be used. For example, the adjustment tool can be a dial/knob interface, two arrow buttons (for adjusting numerical values up or down), and the like. It should also be recognized that the range of values can be displayed along with the selected value within the range. Furthermore, an adjustment tool can be provided to allow the range to be adjusted.

With reference again to FIG. 3, in step 306, a measured diffraction signal is displayed. The measured diffraction signal is measured using an optical metrology tool. In step 308, a simulated diffraction signal is displayed. The simulated diffraction signal is generated based on the values of the profile parameters selected using the adjustment tools for the profile parameters. The simulated diffraction signal is overlaid with the measured diffraction signal to facilitate visual comparison of the two diffraction signals.

For example, with reference again to FIG. 4A, a measured diffraction signal 408 is overlaid with simulated diffraction signal 410. By overlaying measured diffraction signal 408 with simulated diffraction signal 410, a user can more easily determine the degree of fit between the two diffraction signals. In the present example, simulated diffraction signal 410 depicted in FIG. 4A was generated using the values of profile parameter x0, x1, x2, and x3 displayed in display 400 (i.e., 185, 195, 318.53, and 13 nanometers). As described above, simulated diffraction signal 410 can be generated using a numerical analysis technique, such as RCWA, or using a machine learning system.

In the present exemplary embodiment, a user can adjust the values of any one or more of the displayed profile parameters. A new simulated diffraction signal, which is generated using the adjusted values of the profile parameters, is then displayed. Thus, in this manner, a user can visually evaluate the effect that adjusting one or more profile parameters will have on the simulated diffraction signal. Additionally, by displaying the simulated diffraction signal overlaid with the measured diffraction signal, the user can adjust the values of the profile parameters to improve the match between the simulated diffraction signal and the measured diffraction signal. Furthermore, the user can determine the desired ranges of values of the profile parameters.

Figure 4B:
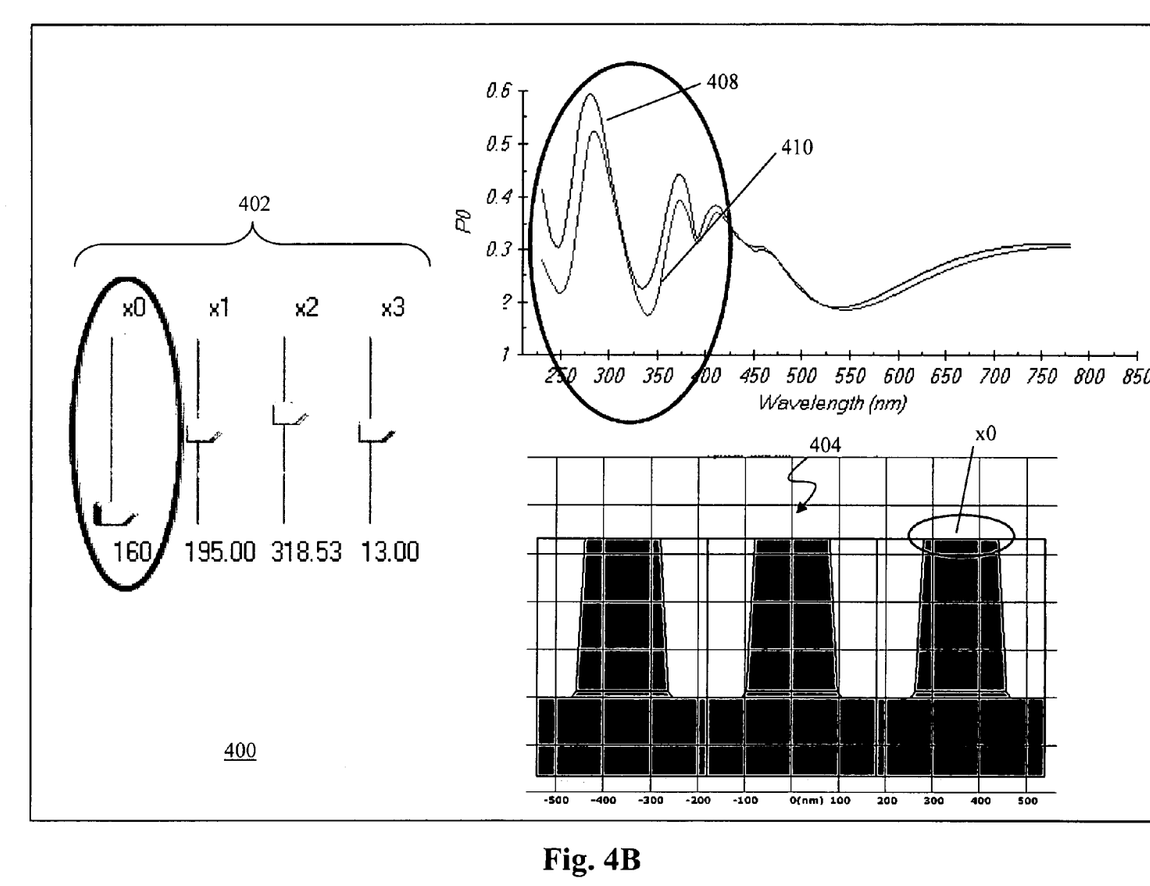

For example, FIG. 4B depicts adjusting the value of profile parameter x0 from 185 to 160. As depicted in FIG. 4B, the shape of profile model 404 displayed in display 400 is adjusted (i.e., the top width of profile model 404 is smaller in FIG. 4B than in FIG. 4A). Also, the shape of simulated diffraction signal 410 displayed in display 400 is adjusted. Thus, by examining the change in simulated diffraction signal 410, the user can evaluate the effect of adjusting profile parameter x0.

Figure 5:
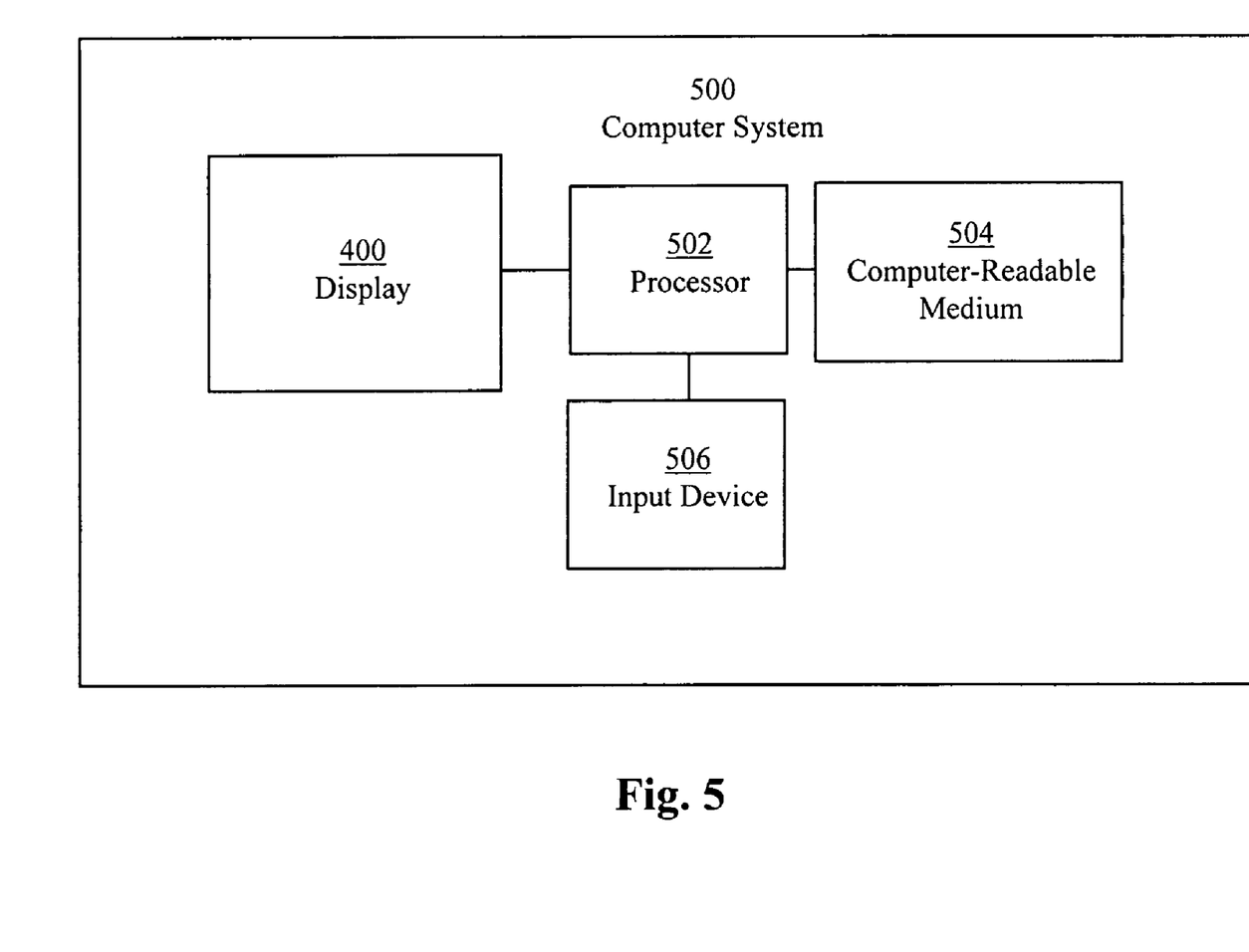
FIG. 5 depicts an exemplary computer system.

With reference to FIG. 5, in the present exemplary embodiment, display 400 can be a component of a computer system 500. As depicted in FIG. 5, computer system 500 can include a processor 502 that is configured to perform process 300 (FIG. 3). Computer system 500 can also include a computer-readable medium 504, such as a hard disk, solid date memory, etc., that can include computer-executable instructions to direct the operation of processor 502 in performing process 300 (FIG. 3). Computer system 500 can further include an input device 506 configured to receive input from the user.

It should be recognized that computer system 500 can include various additional components not depicted in FIG. 5. Additionally, it should be recognized that computer system 500 can be physically embodied in various forms. For example, computer system 500 can be a unitary computer, such as a workstation, or can be part of a distributed computer system.

Although exemplary embodiments have been described, various modifications can be made without departing from the spirit and/or scope of the present invention. Therefore, the present invention should not be construed as being limited to the specific forms shown in the drawings and described above.

We claim:

1. A method of evaluating a profile model to characterize a structure to be examined using optical metrology, the method comprising:
   a) displaying a set of profile parameters that characterizes the profile model, each profile parameter having a range of values for the profile parameter;
   b) for each profile parameter having a range of values, displaying an adjustment tool for selecting a value for the profile parameter within the range of values;
   c) displaying a measured diffraction signal, wherein the measured diffraction signal was measured using an optical metrology tool; and
   d) displaying a simulated diffraction signal, wherein the simulated diffraction signal was generated based on the values of the profile parameters selected using the adjustment tools for the profile parameters, and wherein the simulated diffraction signal is overlaid with the measured diffraction signal.

2. The method of claim 1, further comprising:
displaying the profile model.

3. The method of claim 1, further comprising:
when a new value is selected for a profile parameter using the adjustment tool for the profile parameter, displaying a new simulated diffraction signal, wherein the new simulated diffraction signal was generated based on the new value selected for the profile parameter, and wherein the new simulated diffraction signal is overlaid with the measured diffraction signal.

4. The method of claim 3, further comprising:
when the new value is selected, displaying a new profile model.

5. The method of claim 1, further comprising:
for each profile parameter having a range of values, displaying the selected value for the profile parameter.

6. The method of claim 1, further comprising:
for each profile parameter having a range of values, displaying the range of values.

7. The method of claim 1, wherein the simulated diffraction signal is generated using a numerical analysis technique.

8. The method of claim 1, wherein the simulated diffraction signal is generated using a machine learning system.

9. The method of claim 1, further comprising:
generating a set of hypothetical profiles by varying one or more of the profile parameters that characterize the profile model;
generating a set of simulated diffraction signals using the set of hypothetical profiles; and
storing the set of hypothetical profiles and set of simulated diffraction signals in a library.

10. The method of claim 1, further comprising:
generating a first hypothetical profile using the profile model;
generating a first simulated diffraction signal using the first hypothetical profile;
obtaining a measured diffraction signal;
comparing the first simulated diffraction signal and the measured diffraction signal; and
when the first simulated diffraction signal and the measured diffraction signal do not match within a matching criterion, generating a second hypothetical profile by adjusting one or more of the profile parameters that characterize the profile model;
generating a second simulated diffraction signal using the second hypothetical profile; and
comparing the second simulated diffraction signal and the measured diffraction signal.

11. A computer-readable medium containing computer-executable instructions for evaluating a profile model to characterize a structure to be examined using optical metrology, comprising instructions for:
a) displaying a set of profile parameters that characterizes the profile model, each profile parameter having a range of values for the profile parameter;
b) for each profile parameter having a range of values, displaying an adjustment tool for selecting a value for the profile parameter within the range of values;
c) displaying a measured diffraction signal, wherein the measured diffraction signal was measured using an optical metrology tool; and
d) displaying a simulated diffraction signal, wherein the simulated diffraction signal was generated based on the values of the profile parameters selected using the adjustment tools for the profile parameters, and wherein the simulated diffraction signal is overlaid with the measured diffraction signal.

12. The computer-readable medium of claim 11, further comprising instructions for:
when a new value is selected for a profile parameter using the adjustment tool for the profile parameter, displaying a new simulated diffraction signal, wherein the new simulated diffraction signal was generated based on the new value selected for the profile parameter, wherein the new simulated diffraction signal is overlaid with the measured diffraction signal.

13. The computer-readable medium of claim 12, further comprising instructions for:
when the new value is selected, displaying a new profile model.

14. The computer-readable medium of claim 11, further comprising instructions for:
for each profile parameter having a range of values, displaying the selected value for the profile parameter.

15. The computer-readable medium of claim 11, further comprising instructions for:
for each profile parameter having a range of values, displaying the range of values.

16. The computer-readable medium of claim 11, further comprising instructions for:
generating a set of hypothetical profile by varying one or more of the profile parameters that characterize the profile model;
generating a set of simulated diffraction signals using the set of hypothetical profiles; and
storing the set of hypothetical profiles and set of simulate diffraction signals in a library.

17. The computer-readable medium of claim 11, further comprising instructions for:
generating a first hypothetical profile using the profile model;
generating a first simulated diffraction signal using the first hypothetical profile;
obtaining a measured diffraction signal;
comparing the first simulated diffraction signal and the measured diffraction signal; and
when the first simulated diffraction signal and the measured diffraction signal do not match within a matching criteria, generating a second hypothetical profile by adjusting one or more of the profile parameters that characterize the profile model;
generating a second simulated diffraction signal using the second hypothetical profile; and
comparing the second simulated diffraction signal and the measured diffraction signal.

18. A system for evaluating a profile model to characterize a structure to be examined using optical metrology, the system comprising:
a display unit; and
a processor connected to the display unit and configured to:
a) display on the display unit a set of profile parameters that characterizes the profile model, each profile parameter having a range of values for the profile parameter;
b) for each profile parameter having a range of values, display on the display unit an adjustment tool for selecting a value for the profile parameter within the range of values;
c) display on the display unit a measured diffraction signal, wherein the measured diffraction signal was measured using an optical metrology tool; and
d) display on the display unit a simulated diffraction signal, wherein the simulated diffraction signal was generated based on the values of the profile parameters selected using the adjustment tools for the profile parameters, and wherein the simulated diffraction signal is overlaid with the measured diffraction signal.

19. The system of claim 18, wherein the processor is configured to:
when a new value is selected for a profile parameter using the adjustment tool for the profile parameter, display on the display unit a new simulated diffraction signal, wherein the new simulated diffraction signal was generated based on the new value selected for the profile parameter, wherein the new simulated diffraction signal is overlaid with the measured diffraction signal.

20. The system of claim 18, wherein the processor is configured to:
for each profile parameter having a range of values, display on the display the selected value for the profile parameter.

* * * * *